United States Patent Office 2,852,535
Patented Sept. 16, 1958

2,852,535

DISULFONIC ACID AMIDES OF THE ANTHRAQUINONE SERIES

Albin Peter, Binningen, and Erhard Wydler, Basel, Switzerland, assignors to Sandoz A. G., Basel, Switzerland, a Swiss firm No Drawing. Application March 8, 1957
Serial No. 644,739

Claims priority, application Switzerland April 7, 1956

7 Claims. (Cl. 260—374)

The present invention relates to a process for the production of disulfonic acid amides of the anthraquinone series which have the general formula

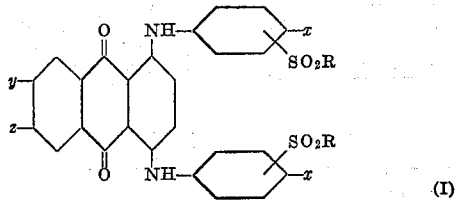

wherein:

x stands for hydrogen, lower alkyl or lower alkoxy,
y for chlorine or bromine,
z for hydrogen or chlorine, when y represents chlorine, or for hydrogen, when y represents bromine, and
R denotes the radical of a primary or secondary aliphatic amine which possesses at least 3 carbon atoms and may contain further substituents or the radical of a primary, wholly or partially hydrogenated mono- or dinuclear aromatic amine, or the radical of morpholine.

Of particular interest are the disulfonic acid amides of the anthraquinone series, in which y and z stand for chlorine atoms and x for a methyl group, the most valuable dyestuffs however being those in which R represents a radical of cyclohexylamine, n-octylamine, 2-ethylhexylamine, 1.1.3.3-tetramethylbutylamine or 1-amino-5.6.7.8-tetrahydronaphthalene.

The process for the production of the disulfonic acid amides of the anthraquinone series consists in reacting 1 mol of a 1.4-diarylaminoanthraquinone disulfonic acid chloride of the general formula

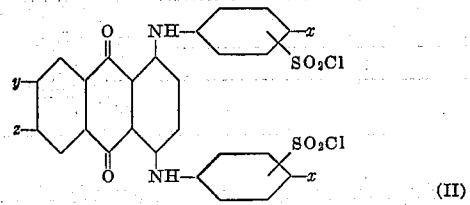

wherein x, y and z have the above-mentioned meanings, with 2 mols of a primary or secondary aliphatic amine which contains at least 3 carbon atoms and may carry further substituents, or of a primary, wholly or partially hydrogenated, mono- or dinuclear aromatic amine, or of morpholine.

As examples of the starting materials used to prepare the disulfonic acid amides may be mentioned the disulfonic acid chlorides of the derivatives of 1.4-diphenylaminoanthraquinone, 1.4-di-(4′-methyl or ethyl or butyl)-phenylaminoanthraquinone and 1.4-di-(4′-methoxy or ethoxy)-phenylaminoanthraquinone, the said chlorides being halogenated in the 6 and/or 7 positions. One method of preparing the disulfonic acid chlorides is to allow chlorosulfonic acid to act upon the appropriate 1.4-diarylaminoanthraquinone derivatives, which may be sulfonated in the arylamino radicals, until the compounds are soluble in a hot dilute solution of alkalimetal hydroxide but insoluble in water.

Examples of suitable amines are the primary butyl, amyl, hexyl, cyclohexyl, methylcyclohexyl, octyl and dodecyl amines and their alkoxy derivatives, the diethyl and dibutyl amines, and morpholine. Particularly interesting are cyclohexylamine, n-octylamine, 2-ethylhexylamine, 1.1.3.3-tetramethylbutylamine, and 1-amino-5.6.7.8-tetrahydronaphthalene.

Condensation is accomplished by mixing the disulfonic acid chlorides, in the form of hydrous filter cakes, with the amines. The amines themselves may serve as solvents and diluents; alternatively, water, alcohols such as methyl, ethyl and propyl alcohols, ketones such as acetone, methyl ethyl ketone, ether alcohols such as 2 methoxy- and 2-ethoxy-ethanol, dioxane, and mixtures of aqueous alcohols, ketones and ethers can be used. Condensation may be carried out at normal or moderately high temperatures, e. g. at 20°–100° C., though 35° to 60° C. is the preferred temperature range.

The liberated hydrochloric acid is combined by an excess of the amine employed in condensation or by an acid-binding agent. Suitable acid-binding agents are alkali metal bicarbonates such as sodium and potassium bicarbonate, alkali metal and alkaline earth metal carbonates such as the carbonates of sodium, potassium, lithium, magnesium and calcium, hydroxides of the alkali and alkaline earth metals such as sodium, potassium and calcium hydroxide, magnesium oxide, trisodium phosphate, or a mixture of an alkali metal acetate and one of the previously named acid-binding agents.

The disulfonic acid amides are separated from the reaction mixture by diluting with water, salt water, or dilute hydrochloric or sulfuric acid, and are subsequently filtered off. Alternatively, when condensation is effected in an excess of the amine, the reaction mixture can be evaporated to dryness with reduced pressure and the residue digested with dilute hydrochloric or sulfuric acid and then filtered off.

The condensation products are the disulfonic acid amides corresponding to the disulfonic acid chlorides used as starting materials. The secondary amines are basic enough to initiate condensation before a hydrolysis of the disulfonic acid chlorides occurs. When the suction-filtered disulfonic acid amides of the primary or secondary amines are washed with water, minute quantities of soluble products are removed.

The new disulfonic acid amides of the anthraquinone series are employed for the solution dyeing of fibers which are spun from organic solvents, for printing fabrics of "Dacron," "Dynel" (registered trademarks) and cellulose triacetate, and for pigmenting lacquers, plastics and wood stains.

The following examples illustrate the invention. The parts and percentages specified therein are by weight and the temperatures are in degrees centigrade.

EXAMPLE 1

The humid disulfonic acid chloride of 122 parts of 1.4-di-(4′-methyl)-phenylamino - 6.7 - dichloroanthraquinone is stirred into a mixture of 105 parts of cyclohexylamine, 54 parts of sodium bicarbonate, 2 parts of a non-ionic wetting agent and 100 parts of water. After 10 hours' continuous agitation at 45° the amidation product is isolated by filtration, washed thoroughly with hot water and dried. It is obtained as a green powder which has very good solubility in acetone.

100 parts of cellulose acetate with a content of 54–55% of splittable acetic acid are mixed with 300 parts of a solvent (e. g. a mixture of 275 parts of acetone and 25 parts of methanol). The mass is stirred and left overnight to swell.

On the following day 1 part of the disulfonic acid amide of the anthraquinone series obtained according to the present example are dissolved in 60 parts of the same solvent. This solution is added to the cellulose acetate solution and the whole stirred long enough for 60 parts of the solvent to evaporate.

After being filtered through cotton filters and cotton pressure filters the dyed solution is spun into filament in the same way as undyed cellulose acetate.

EXAMPLE 2

Into a well stirred mixture of 204 parts of cyclohexylamine, 132 parts of anhydrous sodium carbonate, 1 part of a non-ionic wetting agent and 200 parts of water at 55° are entered 1800 parts of the moist paste of the disulfonic acid chloride prepared with 226 parts of 1.4-di-(4'-methyl)-phenylamino-6 - chloroanthraquinone. The mixture is maintained at 55° for 6 hours. The condensation product is isolated in the manner described in Example 1 and the dyestuff is obtained as a green powder.

When the 132 parts of anhydrous sodium carbonate are replaced by a mixture of 345 parts of crystallized trisodium phosphate and 71 parts of anhydrous disodium phosphate and the volume of water increased to 1000 parts, equally good results are obtained.

EXAMPLE 3

507 parts of 1.4-di-(4'-methyl)-phenylamino-6-bromoanthraquinone are converted into the disulfonic acid chloride. The reaction product, isolated as a moist filter cake, is stirred into a mixture of 410 parts of cyclohexylamine, 1100 parts of a 30% sodium hydroxide solution, 5 parts of a non-ionic wetting agent and 2600 parts of water at 30°. The reaction is allowed to proceed for 12 hours at constant temperature, after which the precipitated disulfonic acid amide is filtered off and dried. It is a green dyestuff powder soluble in acetone.

EXAMPLE 4

The moist disulfonic acid chloride of Example 1 is stirred into a mixture of 300 parts of cyclohexylamine and 150 parts of isopropyl alcohol. The mass is maintained at 50° for 6 hours, then the reaction mixture is run slowly into a well stirred mixture of 450 parts of concentrated hydrochloric acid, 1200 parts of water and 650 parts of finely crushed ice. The reaction product is suctioned off and washed with water till the filtrate reacts neutral. The filter cake is added to a solution of 5 parts of sodium carbonate in 500 parts of water. After stirring for 30 minutes at 80–85° the insoluble dyestuff is suctioned off, washed with hot water till the filtrate reacts neutral, and dried. The resultant dyestuff is identical with that of Example 1.

A nitrocellulose lacquer is prepared by dissolving a mixture of 100 parts of collodion cotton of medium viscosity and 250 parts of an alkyd resin, plasticized with 25 parts of dioctyl phthalate, in 1000 parts of a solvent composed of 225 parts of ethyl glycol acetate, 190 parts of ethyl alcohol, 75 parts of methyl alcohol, 75 parts of methyl acetate, 15 parts of butyl alcohol and 420 parts of ethyl acetate.

5 parts of the disulfonic acid amide obtainable according to the present example are gradually added to 1000 parts of this nitrocellulose lacquer and the mass stirred till the dyestuff has completely dissolved.

A lacquer of blue-green tone is obtained which is suitable for application to the most varied objects.

EXAMPLE 5

The disulfonic acid chloride of Example 3 is stirred into a suspension of 80 parts of magnesium oxide, 350 parts of sodium acetate, 533 parts of 2-ethylhexylamine and 4000 parts of a 25% aqueous alcohol. The mass is maintained at 35° for 16 hours. After this time it is weakly acidified with hydrochloric acid and the precipitated dyestuff filtered off, washed thoroughly with water, and dried. The dyestuff is a green powder which dissolves very well in acetone.

20 parts of the dyestuff obtained according to this example are stirred into 280 parts of cold water and, after the addition of 150 parts of a mixture of equal quantities of ethyl alcohol and phenol, are brought into solution by heating to 30–40°. The mixture is then given 500 parts of a solution of 167 parts of crystal gum in 333 parts of water, followed by 50 parts of thiourea.

The paste thus obtained is eminently suitable for printing on fabrics of "Dacron," "Dynel" (registered trademarks) and cellulose triacetate. After printing the fabric is steamed for 30 minutes without excess pressure, washed with a solution of 1 g. of a sulfonated fatty alcohol per liter water, rinsed and dried. An attractive green print is obtained.

In the following table further disulfonic acid amides of the anthraquinone series are enumerated which are obtainable according to the particulars of Examples 1 to 5. They are characterized by the disulfonic acid chloride, the amine employed for condensation, and by the color of the disulfonic acid amide when dissolved in acetone.

*Table*

| Example No. | Disulfonic Acid Chloride of— | Amine | Color in Acetone Solution |
|---|---|---|---|
| 6 | 1.4-Di-(4'-methoxy)-phenylamino-6.7-dichloroanthraquinone. | n-Octylamine | green. |
| 7 | 1.4-Di-(4'-methoxy)-phenylamino-6-chloroanthraquinone. | technical Dodecylamine. | Do. |
| 8 | ----do---- | Morpholine | Do. |
| 9 | 1.4-Di-(4'-ethoxy)-phenylamino-6-chloroanthraquinone. | Diisobutylamine | Do. |
| 10 | 1.4-Diphenylamino-6-chloroanthraquinone. | Diethylamine | blue-green. |
| 11 | 1.4-Diphenylamino-6.7-dichloro-anthraquinone. | technical Amylamine. | green. |
| 12 | ----do---- | 3-(Isopropoxy)-propylamine. | Do. |
| 13 | 1.4-Di-(4'-methyl)-phenylamino-6-chloroanthraquinone. | n-Butylamine | bluish green. |
| 14 | 1.4-Di-(4'-tert.butyl)-phenylamino-6-chloroanthraquinone. | Cyclohexylamine | green. |
| 15 | 1.4-Di-(4'-methyl)-phenylamino-6.7-dichloroanthraquinone. | 4-Methylcyclohexylamine. | Do. |
| 16 | ----do---- | n-Hexylamine | Do. |
| 17 | ----do---- | n-Octylamine | Do. |
| 18 | ----do---- | Di-n-butylamine | yellowish green. |
| 19 | ----do---- | 1-Amino-5.6.7.8-tetrahydronaphthalene. | green. |
| 20 | ----do---- | 2-Ethylhexylamine. | Do. |
| 21 | ----do---- | 1.1.3.3-Tetramethylbutylamine. | Do. |

Formulae of representative dyestuffs of the foregoing examples are:

EXAMPLES 1 AND 4

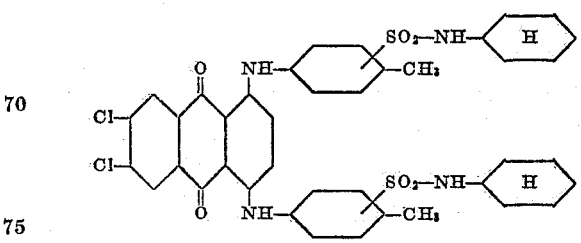

EXAMPLE 2

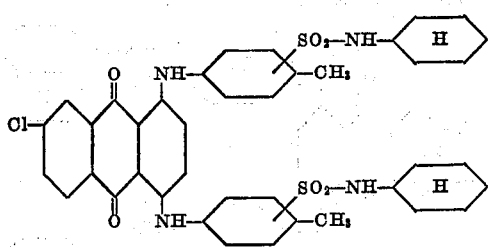

EXAMPLE 3

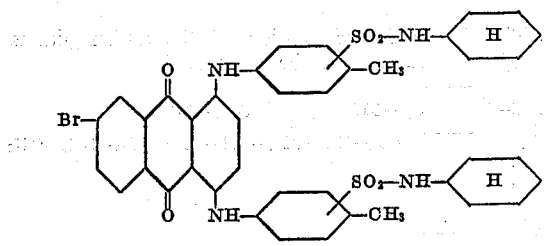

EXAMPLE 5

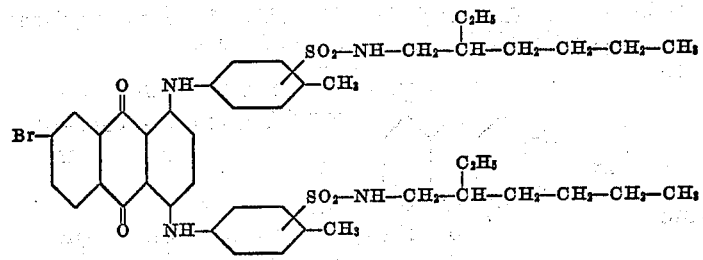

EXAMPLE 17

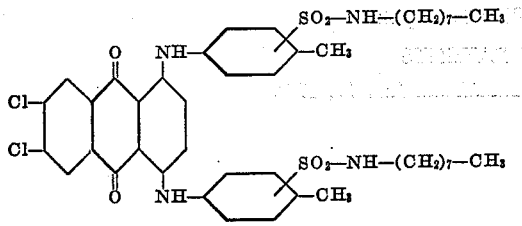

EXAMPLE 19

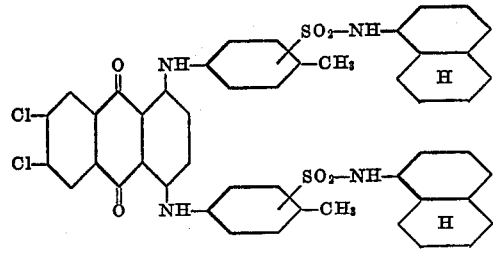

EXAMPLE 20

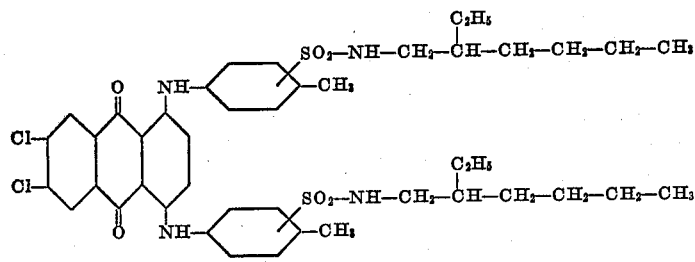

EXAMPLE 21

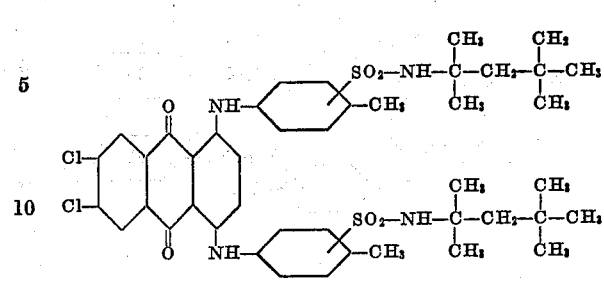

Having thus disclosed the invention what is claimed is:

1. A disulfonic acid amide of the anthraquinone series which corresponds to the formula $$A-(NH-Aryl-SO_2-R)_2$$

wherein A stands for an anthraquinone radical which bears the (NH—Aryl—SO₂—R) groups in the positions 1 and 4 and contains in the positions 6 and 7 at least one halogen atom selected from the group consisting of chlorine and bromine atoms, the other positions of the anthraquinone nucleus being unsubstituted, Aryl stands for a phenylene radical bearing in para-position to —NH— a member selected from the group consisting of hydrogen, lower alkyl and lower alkoxy, and R stands for a member selected from the group consisting of an alkylamino radical containing at least 3 carbon atoms, an alkoxyalkylamino radical containing at least 4 carbon atoms, a dialkylamino radical containing at least 3 carbon atoms, a cycloalkylamino radical, a tetrahydronaphthylamino radical and the morpholyl radical.

2. A disulfonic acid amide of the anthraquinone series which corresponds to the formula

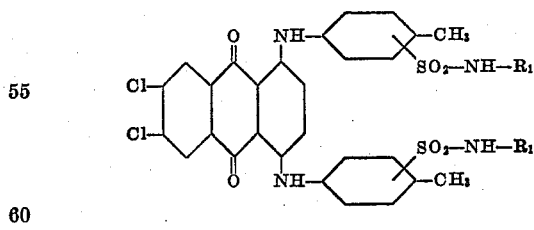

wherein R₁ stands for a member selected from the group consisting of unbranched and branched octyl radicals, cyclohexyl and tetrahydronaphthyl radicals.

3. The disulfonic acid amide of the anthraquinone series which corresponds to the formula

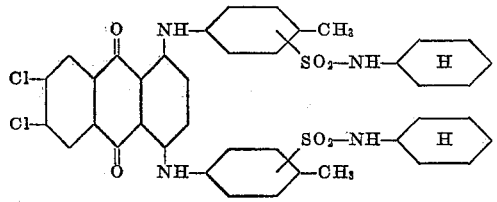

4. The disulfonic acid amide of the anthraquinone series which corresponds to the formula

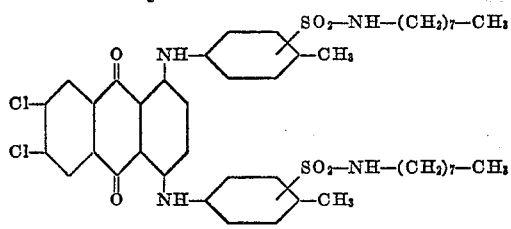

5. The disulfonic acid amide of the anthraquinone series which corresponds to the formula

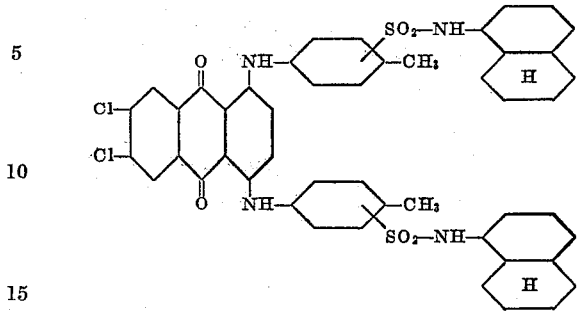

6. The disulfonic acid amide of the anthraquinone series which corresponds to the formula

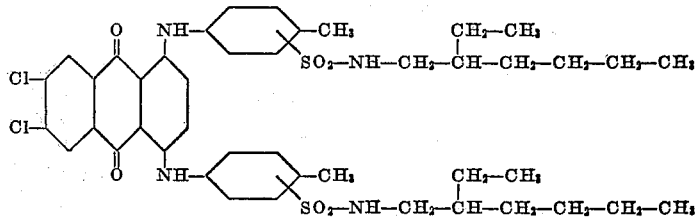

7. The disulfonic acid amide of the anthraquinone series which corresponds to the formula

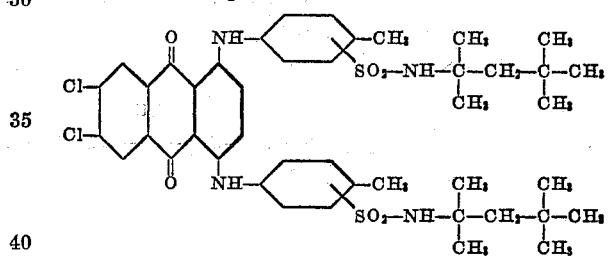

References Cited in the file of this patent
UNITED STATES PATENTS
2,731,476    Peter et al. _____ Jan. 17, 1956